United States Patent Office 2,744,743
Patented May 8, 1956

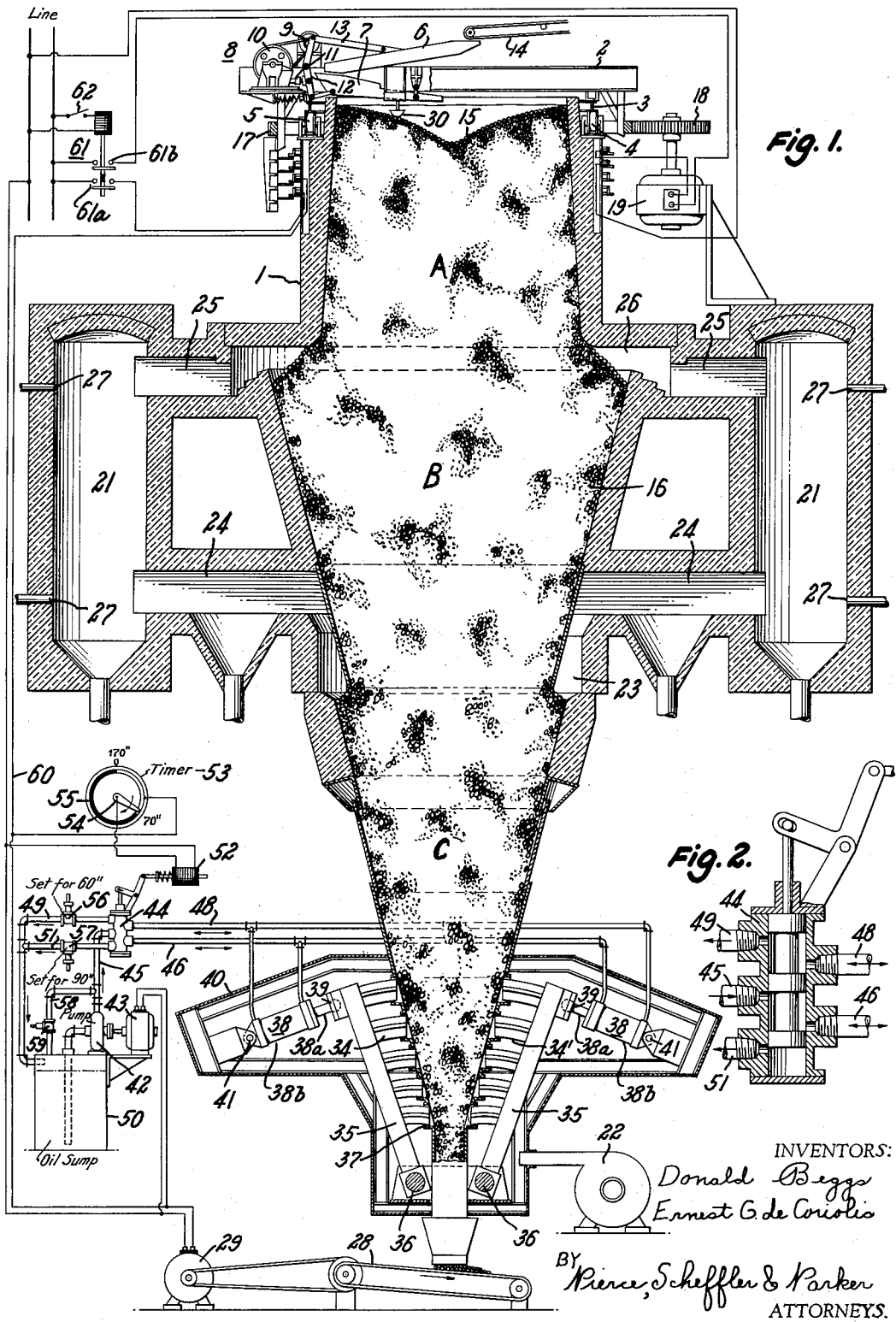

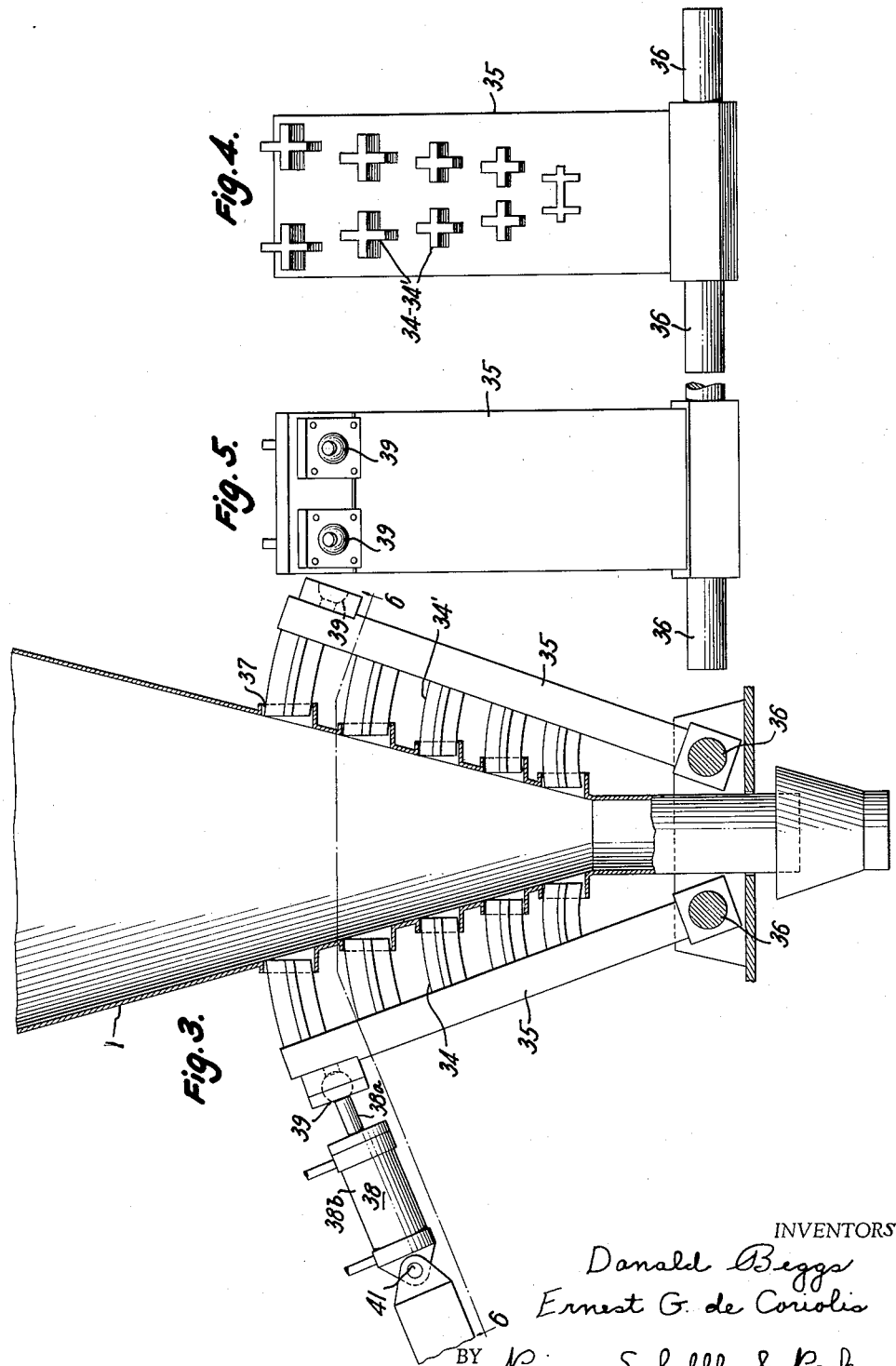

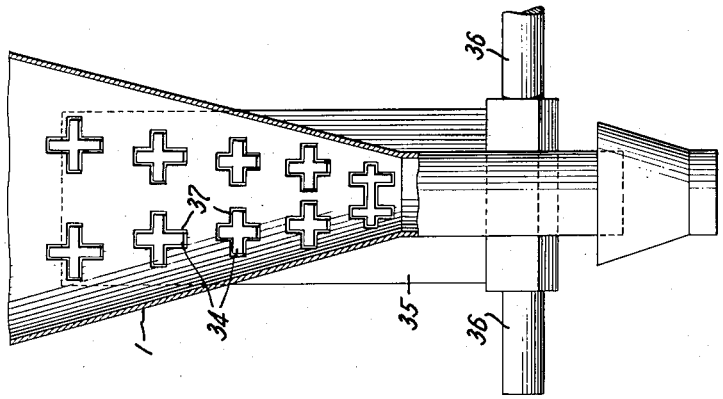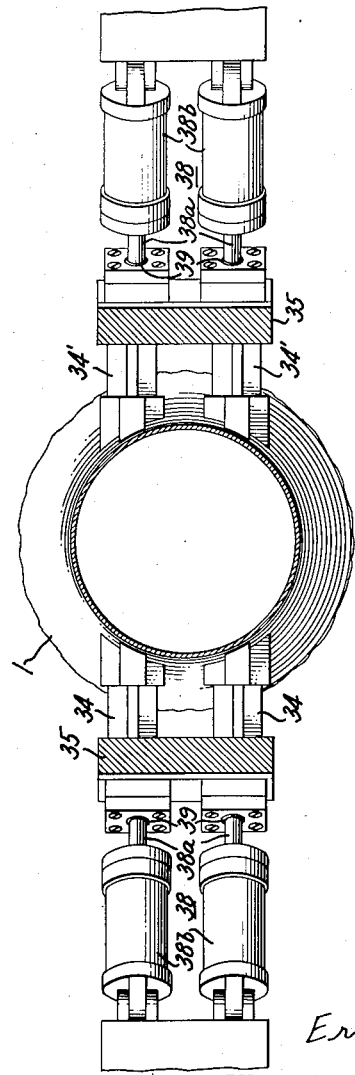

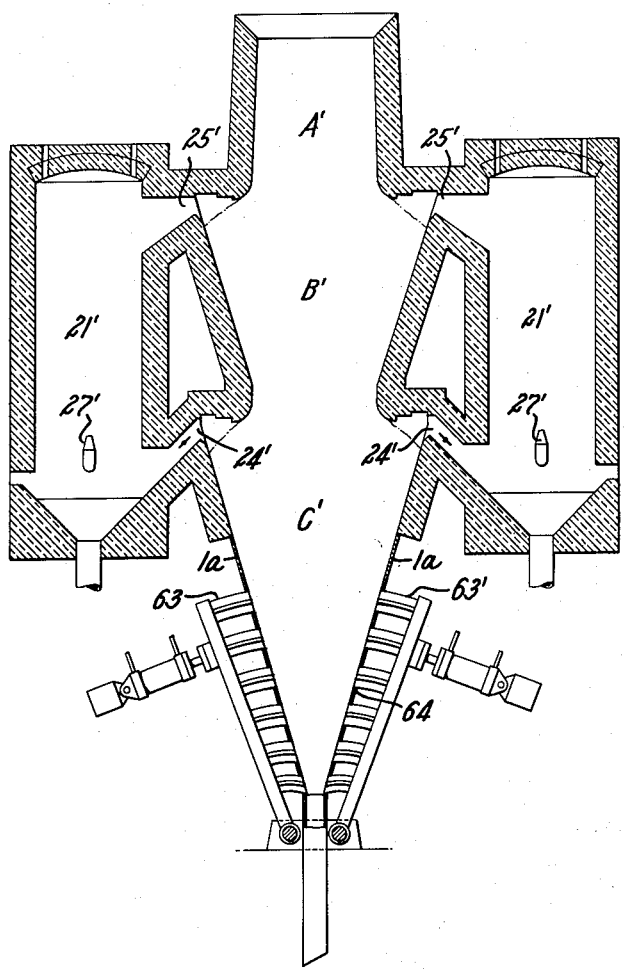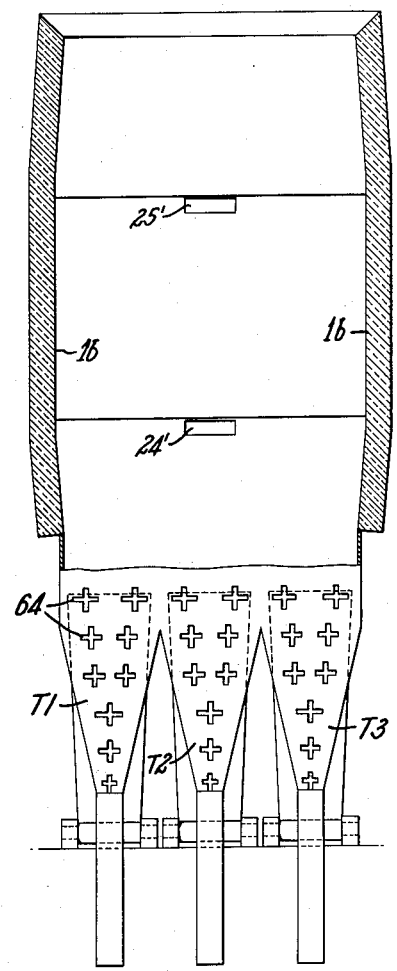

2,744,743

PELLET INDURATING PROCESS AND APPARATUS

Donald Beggs and Ernest G. de Coriolis, Toledo, Ohio, assignors to Erie Mining Company, Hibbing, Minn., a corporation of Minnesota Application November 5, 1951, Serial No. 254,956

13 Claims. (Cl. 263—29)

This invention relates to the art of heat-treating fluent solid materials, e. g., pellets and the like, in a shaft furnace, and is concerned with improvements in the operation of such heat-treating furnace from the standpoint of effecting uniform descent of a column of fluent solid material through such furnace. More specifically, the invention is concerned with the provisions of means for breaking up gross aggregations (i. e., "chunks") of initially particulate solids in the column—aggregations formed either by adhesion of particles in the uppermost part of the charge column due to localized inadvertent condensation of moisture thereon from the spent gases or by inadvertent sintering together of particles—whereby to avoid the "hanging" and "sticking" of portions of the column and hence to promote uniform descent of the latter. A particular application of the invention is to a furnace, of the shaft type, for indurating pellets, briquettes or other relatively small, shaped, masses of moist mineral solids such as ore fines, ore concentrates, phosphate rock fines, Portland cement raw materials, and the like, which shaped masses possess, as formed, too little mechanical strength to permit their direct use in the ensuing processing operation (i. e., in the blast furnace, in the case of iron ore fines or concentrates; in the electric furnace, in the case of phosphate rock fines or concentrates) and which, therefore, must before ultimate use be rendered rugged and mechanically strong by an appropriate thermal indurating treatment. Reference is here made to U. S. Patent No. 2,533,142, issued December 5, 1950, to Percy H. Royster, as describing an illustrative indurating process applicable to pellets or other small fluent masses of mineral fines.

In effecting such indurating treatments it has been found that the mechanical strength conferred upon initially feeble and fragile pellets (or other formed masses) of moist mineral fines is roughly proportional to the top temperature to which they are subjected, other conditions being constant. Thus, it has been found that in indurating pellets of iron ore concentrates in a shaft type furnace, in which a continuously maintained charge column of the pellets gravitationally descends through the shaft in countercurrent to a current of heating gas, it is advantageous—from the standpoint of the ruggedness of the indurated product—to heat the pellets to a temperature below, but as close as possible to, the fusing temperature of the iron ore particles. The same is true in heat-treating Portland cement raw mix, and in other applications of the induration procedure.

An overly close approach to the fusing temperature of the solid material being processed frequently results in localized areas of over-heating with softening of surface particles of adjacent pellets and consequent sticking together of numbers of pellets into relatively large "chunks." Particularly in the case where the furnace so employed is characterized by having a conical or pyramidal bottom portion, the existence of such chunks in the descending column is bound to interfere with the uniform descent of the column. Chunks tend to bridge together, or to bridge across the conical or pyramidal bottom portion of the furnace, and thereby to block the descent of pellets above but generally in the vertical plane of the chunks. Such interference may, and occasionally does, make itself felt, in such affected sector, to substantially the height of the column. Presence of such chunks also interferes with the uniform upward flow of gas through the charge column. These conditions directly produce serious irregularity in the conduct of the induration, especially as regards the uniformity with which induration is effected in different sectors of the charge column. Uniform descent of the charge is an important prerequisite to successful commercial operation of the above described type of induration furnace.

It heretofore had been proposed to meet the aforesaid condition, by positioning in the lower portion of the induration furnace a generally horizontal, annular grinding means comprising two cooperating members, viz., a stationary toothed annulus fixed to the inner surface of the furnace structure and a cooperating, axially disposed, rotating cone or disc member having a toothed periphery, the stationary toothed annulus and rotatable member being spaced apart an arbitrary distance. It was intended that operation of such device would effect the disintegration of any chunks by a "grinding" action. However, it was found that the device was unfeasible, in that it seriously interfered with what should have been the "normal" descent of the charge; moreover, irregular shaped chunks would on occasion bridge over the device and make the latter inoperative as regards a disintegrating function. Furthermore, the grinding action of the device tended to increase the wastage (i. e., proportion of fines) in the indurated product.

It has now been found that operation of the above described type of shaft furnace, in the induration or other heat-treatment of pellets or similar relatively small fluent masses of finely divided mineral solids, may be materially improved as to uniformity of descent of charge and as to uniformity of heat-treatment of the masses constituting the charge by providing at any suitable level—usually in the lower portion—of the furnace chunk-crushing means which do not interfere with the normal descent of the charge column but rather do positively promote such normal descent while effecting the crushing or breaking of any chunks, which chunk-crushing means will now be described in the following paragraphs.

In essence, the chunk-crushing means of the present invention is a probing device comprising at least one group, and usually two or more opposed groups, of probes which probe into the charge column, at a plurality of loci in any suitable, e. g., the lower, portion of the column, and, when the same encounter an abnormal cluster or aggregation or "chunk" of fused-together pellets (or other small masses), crush the latter. The device is incapable of reducing the normal particle size of the discrete pellets. So long as the device encounters no abnormal aggregation of particulate solids in its probing movement, it does no work: its action in such event is merely that of probing into the descending column of pellets. To avoid crushing individual pellets, the rate of displacement of the several probes as the same advance into the column is caused to be substantially no greater than is the normal rate of withdrawal of pellets from the bottom portion of the charge column: the discrete pellets simply flow around the probes as the latter advance and retract. Although the probes advance slowly into the column, when a resistance (i. e., a chunk) is encountered the available crushing force exerted by opposed probes is of a high order (e. g., 100,000 pounds) and sufficient to demolish the chunk or to reduce the size of the latter sufficiently to pass readily through the discharge device in the bottom of the furnace.

The crushing force is exerted either between opposed probes or, in the case where a single group of probes is used, between the group of probes and the opposite wall. In the further description, the case of opposed probes, located adjacent the lower portion of the furnace, will be particularly considered.

The probes of each group are mounted along one side of an arm member positioned outside of but adjacent to the lower end of the furnace. The several probes pass into the interior of the furnace through probe openings or slots provided in the wall of the furnace which openings are of shapes corresponding generally to the cross-sectional configurations of the probes and are of sizes somewhat larger than the cross-sectional areas of said probes. Each arm member is pivotally mounted, adjacent one end thereof, on a supporting structure adjacent the outside surface of the wall of the furnace, and is provided with means for moving it about its pivot to advance the several probes, mounted thereon, into the furnace interior, and into and partially through those parts of the charge column adjacent said probe openings on the forward stroke part of a cycle, and to retract the probes to their outwardmost positions on the reverse stroke part of such cycle. Preferably the reverse stroke is effected in a time interval shorter than that for the forward stroke.

The plurality of arm members are substantially symmetrically disposed about the exterior of the furnace, and opposed groups of probes advance toward each other and into the column to provide the desired crushing action upon any chunk lying in the paths of opposed probes.

Preferably the device is so constructed and arranged that the inner ends of the probes, at the conclusion of their simultaneous forward strokes, are spaced apart with those opposed probes which are positioned at the topmost level of the series farthest apart and the underlying probes progressively less and less far apart, it being observed that the opposed probes which are positioned at the bottommost level of the series are, at the conclusion of their forward strokes, spaced apart by a distance greater than the diameter of any individual pellet constituting the charge column. At the termination of the simultaneous reverse strokes, the inner ends of the probes are substantially withdrawn from the charge column and preferably lie in or substantially in the plane or planes of the furnace wall inner surface.

According to the preferred embodiment of the invention, the above described device is enclosed within a substantially gas-tight housing structure (or housing structures) of which latter the furnace wall constitutes a part, and a gas pressure in excess of atmospheric pressure is maintained within the interior of said housing structure (or structures) by continuously forcing a current of gas (usually air) into the housing structure (or structures) by conventional blowing means operatively associated therewith. By this expedient, dust is prevented from escaping from the furnace through the spaces between the probes and the probe openings through the furnace wall. Moreover, by this expedient all or part of the gas (air) normally forced into the lower part of the charge column for countercurrent passage through the latter can be introduced into the furnace, the spaces between the probes and the probe openings functioning as a plurality of gas inlets for this purpose. An angle of repose occurs under the probes as they advance and retract: the open spaces so provided permit a plurality of streams of gas to come into intimate contact with the pellets flowing around the probes. In case the gas (air) is introduced at about room temperature, this expedient serves to cool the probes, the contacted pellets and also those portions of the furnace wall which constitute parts of said housing structure, as well as to prevent escape of dust.

The several probes, at those ends adjacent the furnace, present working faces sufficiently large to avoid simply piercing, i. e., forming a hole, in an encountered chunk as would be the case were the working face to have an effective surface equal to or not much larger than the cross-section of a pellet or individual particle of such chunk. Accordingly, in the preferred embodiment of the invention the working faces of the probes have an over-all dimension several times the maximum dimensions of the average particle constituting the column. Advantageously, the working face is so configured, e. g., cruciform or tricorn or the like, that its actual area is substantially less than that of a circle having the same maximum dimension.

Were the probing device to operate when the charge column was stationary it would crush the pellets in the paths of the probes. To avoid this, the arm member-actuating means preferably are interlocked with the furnace discharge mechanism so that the former can operate only when the latter is energized.

The foregoing principles are exemplified by structural embodiments as shown in the accompanying drawings:

Fig. 1 of these drawings is a view in vertical central section through an indurating furnace of the type having a generally circular conical surface contour;

Fig. 2 is a sectional detail showing the construction of a four-way valve used for control of the fluid-operated motors by which the chunk breakers are actuated;

Fig. 3 is an enlarged section of the lower part of the furnace;

Figs. 4 and 5 are front and rear elevations of one of the chunk breaker arms and the probes carried thereby;

Fig. 6 is a vertical section on line 6—6 of Fig. 3;

Fig. 7 is a vertical sectional detail of the furnace interior at the discharge end; and Figs. 8 and 9 are vertical sections of a rectangular type of furnace showing application thereto of the chunk breaker mechanism according to the invention.

With reference now to the drawings and Figs. 1 to 7 in particular, the indurating furnace 1 is seen to be of the vertical type having an inlet at the top for receiving material to be indurated and an outlet at the bottom from which the indurated material is discharged. The body of the furnace is generally circular in transverse section. Portions of the furnace taper convergingly from top to bottom at a slope which preferably does not exceed 15° from the vertical.

In the particular construction illustrated, charging of the furnace is effected by a rotary type of loader or feeder mechanism such as that disclosed in Patent No. 2,538,556 granted January 16, 1951, to Ernest G. de Coriolis and Rollie P. Campbell.

From a metallurgical point of view, the furnace corresponds generally to that disclosed in the aforesaid U. S. Patent No. 2,533,142. The upper portion A of the furnace constitutes the zone in which the fluent material is subjected to an indurating heat, the lower portion C is the zone in which the indurated material is cooled prior to discharge, and the intermediate portion B is a chamber in which heated material is maintained, at about maximum heating temperature, for a desired interval. That portion of the charge column occupying intermediate chamber B provides substantial impediment to the countercurrent flow of cooling gas therethrough, thereby promoting the passage of cooling gas from zone C into and through a pair of combustion chambers 21 located to each side of the furnace. Air for cooling and combustion, supplied from a suitable source such as the pump 22, enters the bottom of the cooling zone C, rises to the top thereof, and is collected in a plenum space 23 at the top of that zone: in rising through that portion of the charge column occupying zone C, the air cools the indurated material by taking on heat therefrom. The heated air then passes from plenum space 23 in two substantially equal streams through passages 24 into and through both combustion chambers 21, 21 in parallel, and out of the latter through passages 25, 25 into another plenum space 26 communicating with the lower part of the upper, indurating, zone A. Fuel inlets 27 deliver fluid fuel to the chambers 21 for combustion in the air current whereby to thermally enrich the latter prior to its passage through the upper zone A.

Fluent material charged onto the stockline 15 thus undergoes an indurating process as it descends progressively through the furnace and is finally discharged at substantially ambient temperature in a continuous manner by means of a discharge mechanism which, in the form illustrated, is comprised of an endless conveyor belt 28 driven by electric motor 29 and disposed transversely at the discharge mouth of the furnace.

In order that the indurating process shall continue in a satisfactory manner, it is necessary to maintain control over the stockline 15 of the column of material being treated, to the end that its height will remain substantially constant. A feeler cup 30 riding on the stockline is part of such control mechanism but since the latter forms no part of the present invention and is not essential to an understanding thereof no description will be given here. If, however, more detailed information on the stockline control is desired reference can be made to copending applications Serial No. 237,209, filed July 17, 1951, in the names of Fred D. De Vaney and Donald Beggs, and Serial No. 6,743, filed February 6, 1948, in the name of Carl W. Sisco, both of which are assigned to the asignee of the present aplication.

The above described specific structural arrangements, both of the furnace itself and of the means for charging and discharging the furnace, are not essential to a practice of the present invention, which latter is concerned primarily with the provision of means for insuring that the charge column descend progressively and in a uniform maner. All "hanging" or "sticking" of portions of the column, attributable to agglomeration of the material into "chunks" by the close-to-fusing indurating temperature, employed in zone A of the furnace, particularly in the discharge end of the column where the cross-section is substantially smaller than the charging end, must be avoided, and it is with respect to the latter that the present invention is primarily concerned.

As explained in the introductory portion of the specification, the high, close-to-fusing temperature utilized to obtain an optimum degree of induration is not without its disadvantages, since it frequently results in localized overheating of particles which causes their surfaces to soften and stick together and form into "chunks." These "chunks" particularly at the small areaed discharge end of the furnace tend to block the same and therefore interfere with the uniformly progressive descent of the material column.

In order to break up these chunks so that the indurated pellets of material again become discrete there has been devised, according to this invention, an arrangement of probes located adjacent the lower portion of the furnace (zone C) and which are adapted to probe into the column at a plurality of points from opposite directions thereby to crush between them any chunks which happen to lie in their path of movement.

With the furnace construction illustrated in Fig. 1, two groups of probes 34, 34' are utilized. The probes of each group are fixed rigidly to an arm 35 pivoted at its lower end on a shaft 36 for movement in an arcuate path in a vertical plane. The probes move in a direction generally transverse to the major, vertical, axis of the furnace into and out of the column of material through slots 37 in the furnace wall, which slots as shown in Fig. 7 have the same general transverse configuration as that of the probes, e. g., cruciform or tricorn. Probes of other cross-sectional configuration can be used in lieu of the specific cruciform shape illustrated. However, regardless of configuration, the cross-section of the probe should be comparatively large in relation to the size of the particles so as to assure breakage of the chunks as distinguished from merely puncturing holes in the same. Longitudinally, each probe is arcuate, extending along the arc of a circle having its center at the pivot axis of its supporting arm 35 so as to maintain a uniform gap between the probe surface and the edges of slots 37.

As shown in Fig. 4 the probes of each group are superposed at like levels in two generally vertical rows with the probes of each row stepped progressively inwardly from top to bottom to match the taper of the furnace. The two groups of probes are identical and are arranged to be advanced into the column from a fully retracted position shown in full lines in Fig. 3 wherein the inner ends of the probes lie substantially in the plane of the furnace wall to a fully advanced position shown in broken lines. The probes of one group are arranged directly opposite the correspondingly positioned probes of the other group, and when fully advanced are spaced apart at their inner ends by a distance greatest at the topmost set of probes and which decreases progressively to a minimum at the bottom set of probes. Such minimum spacing is, however, preferably made considerably greater than the size of the individual particles, i. e., pellets, being indurated in order to avoid crushing of the pellets themselves. Thus chunks will be broken progressively into smaller and smaller sizes as they pass downward past the several sets of probes without, however, crushing the pellets themselves in the process.

Each group of probes is actuated by a pair of double acting hydraulic motors 38, the piston rods 38a of which are attached to the upper end of the arm 35 by a pivotal connection in the form of a ball and socket joint 39 in view of the arcuate nature of the arm movement. For like reasons each motor cylinder 38b is pivotally connected at 41 to the inner side of an air-tight housing 40 which encloses both groups of probes, their supporting structures and also the motors for actuating the probes. In the illustrated embodiment, air pump 22 is located exteriorly of housing 40 and the air passed into the same flows through the clearance spaces between the surfaces of probes 34 and 34' and the edges of the wall slots 37 into the charge column 16 at a plurality of points close to the vertical axis of the column thus assuring substantially uniform distribution of the air in its upward course through the column. An angle of repose also occurs under the probes as they advance and retract which permits the cooling air to come into intimate contact with the charge material. The clearance between probes and the furnace slots is made quite small in relation to the size of the pellets constituting the charge so that there will be no chance for individual pellets to lodge between the walls of the slots and the probes. For a pellet diameter of the order of an inch a suitable clearance would be about one quarter of an inch. Moreover, the air for cooling the indurated material in passing through the slots 37 and over the surfaces of the probes also serves to cool the latter, and since the lower part of the furnace is completely enclosed by the housing 40 the air therein in constant contact with the exterior surface of the furnace wall also serves to keep the latter cool.

For operating all of the motors 38 in unison, a hydraulic pressure fluid system is utilized, the same being comprised principally of a pump 42 of the constant delivery type driven by an electric motor 43, and a four way control valve 44 connected in the lines between the pump and hydraulic motors for actuating the latter in both directions. With valve 44 in the position shown in Fig. 2, hydraulic fluid delivered under pressure from pump 42 to valve 44 through line 45 passes outward from the valve through the lower line 46 into the ends of the motor cylinders 38b nearest the furnace wall thus causing the arms 35 to be moved simultaneously to their outermost position as depicted in Fig. 1 wherein the probes of both groups occupy their fully retracted position. Hydraulic fluid from the opposite ends of the motor cylinders 38b is returned to valve 44 via line 48 and thence via line 49 to sump 50.

With valve 44 in its other position, hydraulic fluid is delivered therefrom over line 48 to the other end of the motor cylinders 38b and causes the pistons 38a to move in the opposite direction thus advancing the groups of probes into the column of material. Hydraulic fluid is returned from the opposite end of the motor cylinders via line 46 to valve 44 and from the latter to sump 50 via line 51.

It should always be borne in mind that the purpose of the invention is to break up any chunks of pellets by a probing action without, however, reducing the size of the discrete particles themselves. When there are no abnormal chunks of pellets the probing device does no work; it simply probes into the pellet column. To avoid crushing of individual pellets by the probes, the rate of displacement of the probes in entering the column is made to be no greater than the normal rate of withdrawal of the pellets from the bottom of the column by the discharge device 28. For example, a discharge rate of 15 tons of pellets per hour is equal to a pellet descent rate in the furnace of about 5 cu. ft. per minute. With a total probe displacement of 7.5 cu. ft. when the probes occupy their full advanced position, the advance stroke of the probes can thus be set for 1.5 minutes to effect a probe displacement rate of 5 cu. ft. per minute which is the same as the rate of pellet descent and discharge. In the absence of chunks the pellets simply flow around the probes as the latter advance and retract. The retraction stroke of the probes can be made to take place at a faster rate such as 7.5 cu. ft. per minute which would of course require 1 minute.

To place the probing action on a cyclic basis, control valve 44 is arranged to be operated electrically first one way and then the other by a solenoid 52 and timer 53. In the example given above, the advance stroke of the probes will require 90 seconds and the withdrawal 60 seconds. Allowing a 10 second overlap to insure a full operating stroke in each direction, a cycle of 170 seconds will be practical. Such a cycle is illustrated by the timer 53 which is comprised of an arm 54 of conductive material that makes one complete revolution clockwise over the contact ring 55 each 170 seconds. That part of ring 55 which constitutes $70/170$ of the total circumference is made conductive and the remainder non-conductive. Hence for a period of 70 seconds from the 0 starting point on the timer cycle, solenoid 52 will be connected through the timer to a source of power illustrated by the conductors legended "Line," thus holding valve 44 in the position shown in Fig. 2 and motors 38 will operate to move the probes 34, 34' from their fully advanced to fully retracted positions. To maintain the desired 60 second timing for the retraction stroke a speed control valve 56 is placed in the fluid return line 49.

At the end of 70 seconds, timer arm 54 moves onto the insulated portion of contact ring 55 causing solenoid 52 to become de-energized and shifting valve 44 to its other position wherein the motors 38 reverse and start the probes on their advance or inward stroke. Under conditions assumed this stroke should be completed in 90 seconds and the later period is maintained with the aid of another speed control valve 57 placed in the other fluid return line 51. To prevent overloading of the pump 42 during the 10 second overlap periods when under normal conditions the motors 38 will not be operating in either direction, a by-pass line 58 containing a pressure relief valve 59 is placed between the high pressure pump outlet line 45 and the sump 50.

As a safety measure, motor 43 driving the hydraulic pump 42 is preferably electrically interlocked with motor 29 driving the discharge conveyor 28 so that the pump and hence also the probes will be brought to a standstill when the furnace is not discharging, thus preventing crushing of pellets in the stopped pellet column. This has been illustrated schematically simply by connecting the hydraulic pump and furnace discharge motors 43, 29 to the same lines 60 which supply solenoid 52 with current and lead also through the stockline control mechanism on the rotatable carriage to the power source via contacts 61a on the master circuit breaker 61. Other contacts 61b on the latter control the motor 19 driving the carriage so that all operating elements of the system may be started or stopped by a single control switch 62 located in the energizing circuit of the circuit breaker 61.

The chunk breaker apparatus according to the invention may be applied equally as well to shaft furnaces having a transverse configuration which is substantially rectangular as distinguished from the construction shown in Fig. 1, wherein the main body of the furnace is substantially a figure of revolution about the major vertical axis. Such a furnace is shown in Figs. 8 and 9. As viewed in vertical section in Fig. 8, one pair of opposite walls 1a of the furnace exhibits the same general tapered characteristics as those of Fig. 1, the walls converging in the direction of travel of the charge column through the furnace, so that as measured in such direction the cross-section of the furnace decreases in a generally progressive manner. From Fig. 9 it is seen that the other pair of furnace walls 1b extend generally parallel to each other.

Also as in the Fig. 1 construction, combustion chambers 21' are located at each side of the furnace which receive air through passage 24' as it rises through the cooling zone C'. After combustion with fuel injected from nozzles 27' the combustion products discharge through passages 25' into the charge column at the bottom of the indurating zone A' and pass upwardly therethrough.

At the lower end of the cooling zone C' the furnace divides into a plurality of, e. g., three, separate discharge tubes T1, T2 and T3 each rectangular in transverse configuration and tapering convergingly from top to bottom. Each of the discharge tubes is provided with two groups of probes 63, 63' of the same construction as that shown in Fig. 1 and all probe groups are enclosed by a housing (not shown) into which air is admitted from a pump (also omitted in the interest of simplifying the drawings) for circulation upwardly through the furnace, the air entering the charge column through the clearance spaces between the probes and the furnace wall slots 64. All probe groups are of course operated in unison by a system substantially the same as that shown in Fig. 1.

While in the foregoing the probe means have been described and illustrated as operating only at the very bottom of the furnace, it is to be understood that the probe means may be extended upwardly—or, be located at a higher level—with respect to the lower portion C of the furnace so that they can break chucks of substantially the full width of the furnace. Thus, for example, the apparatus can be so constructed and arranged that the top probes operate at a level immediately beneath the lower end of the brickwork (Fig. 1).

We claim:

1. The combination with a vertical, stationary-walled shaft furnace for heat-treating fluent mineral solid particles descending therethrough in a continuous column, of a probing device associated with the furnace for disintegrating chunks of agglomerated particles in said column, said probing device comprising a plurality of probes located adjacent at least one side of the furnace said probes being movable along a path generally transverse of the major axis of the furnace through correspondingly positioned slots in the furnace wall into the furnace interior and toward the opposite wall of the furnace, and means actuating said probes to effect their advance into and retraction from the interior of the furnace, the displacement rate of said probes, relative to the interior of the furnace, in the advance direction being not substantially greater than the rate of descent of such column through that part of the furnace wherein the probes operate.

2. The combination with a vertical, stationary-walled, shaft furnace for heat-treating fluent mineral solid particles descending therethrough in a continuous column, of a probing device associated with the furnace for disintegrating chunks of agglomerated particles in said column, said probing device comprising at least two opposed assemblages of probes located respectively at opposite sides of the furnace, each of said probe assemblages being movable along a path generally transverse of the major axis of the furnace through correspondingly positioned slots in the furnace wall into the furnace interior and towards its opposed counterpart, and means actuating said probe means in unison to effect their simultaneous advance into and retraction from the interior of the furnace, the displacement rate of said probes, relative to the interior of the furnace, in the advance direction being not substantially greater than the rate of descent of such column through that part of the furnace wherein the probes operate.

3. The combination with a vertical, stationary-walled, shaft furnace for heat-treating fluent mineral solid particles descending therethrough in a continuous column, of a probing device associated with the discharge end of the furnace for disintegrating chunks of agglomerated particles in said column, said probing device comprising at least two opposed assemblages of probes located respectively at opposite sides of the furnace, each of said probe assemblages being movable along a path generally transverse of the major axis of the furnace through correspondingly positioned slots in the furnace wall into the furnace interior and towards its opposed counterpart, each probe presenting at that end thereof adjacent the furnace a working face having a maximum dimension several times greater than the maximum dimension of the average particle constituting said column, and means actuating said probe assemblages in unison to effect their simultaneous advance into and retraction from the interior of the furnace, the displacement rate of said probes, relative to the interior of the furnace, in the advance direction being not substantially greater than the rate of descent of such column through that part of the furnace wherein the probes operate.

4. The combination with a vertical, stationary-walled, shaft furnace for heat-treating fluent mineral solid particles descending therethrough in a continuous column, of a probing device associated with the discharge end of the furnace for disintegating chunks of agglomerated particles in said column, said probing device comprising at least two opposed assemblages of probes located respectively at opposite sides of the furnace, each of said probe assemblages being movable along a path generally transverse of the major axis of the furnace through correspondingly positioned slots in the furnace wall into the furnace interior and towards its opposed counterpart, each probe presenting at that end thereof adjacent the furnace a working face having a maximum dimension several times greater than the maximum dimension of the average particle constituting said column and an area substantially less than that of a circle having the same maximum dimension, and means actuating said probe assemblages in unison to effect their simultaneous advance into and retraction from the interior of the furnace, the displacement rate of said probes, relative to the interior of the furnace, in the advance direction being not substantially greater than the rate of descent of such column through that part of the furnace wherein the probes operate.

5. The combination with a vertical, stationary-walled, shaft furnace for heat-treating fluent mineral solid particles descending therethrough in a continuous column, of a probing device associated with the discharge end of the furnace for disintegrating chunks of agglomerated particles in said column, said probing device comprising two opposed groups of probe means located respectively at opposite sides of the furnace, each of said probe means being movable along a path generally transverse of the major axis of the furnace through correspondingly positioned slots in the furnace wall into the furnace interior and towards its opposed counterpart, and means actuating said probe means in unison to effect their simultaneous advance into and retraction from the interior of the furnace, the displacement rate of said probe means, relative to the interior of the furnace, in the advance direction being not substantially greater than the rate of descent of such column through that part of the furnace wherein the probes operate.

6. The combination defined in claim 5, in which each group of probe means includes an arm adjacent the lower end of the furnace and a plurality of probes rigidly secured to said arm, the transverse configuration of said probes corresponding to that of said slots to establish a peripheral gap therebetween.

7. The combination defined in claim 6, further characterized by a housing enclosing said groups of probe means and furnace wall slots, one wall of said housing being constituted by a part of the furnace wall, and means supplying gas under pressure to the interior of the housing.

8. The combination defined in claim 5, in which each group of probe means includes an arm pivotally mounted at one end thereof adjacent the lower end of the furnace and a plurality of arcuate probes rigidly secured to said arm and movable along arcuate paths concentric with the pivot axis of said arm.

9. The combination as defined in claim 5 wherein the lower discharge end of said furnace is conical and converging in the direction of travel of particles therethrough, the probe means of each group are arranged in superposed spaced relation longitudinally of said conical end and the distances between the ends of correspondingly positioned probe means in each group when in their extreme advance position decrease in the direction of particles travel.

10. A vertical shaft furnace having a rectangular configuration in horizontal cross-section for heat-treating a continuous column of fluent material descending therein, the lower end of said furnace being sectionalized to provide a plurality of pyramidal material discharge sections, and a probing device individual to each discharge section for breaking chunks of said material formed during heat treatment, each said probing device being comprised of at least one group of probes located adjacent a side of the associated furnace discharge section the probes of which enter the same through correspondingly aligned slots in the section wall, and means actuating said group of probes to effect their simultaneous advance into and retraction from the interior of said discharge section, the displacement rate of said probes, relative to the interior of the furnace, in the advance direction being not substantially greater than the rate of descent of such column through that part of the furnace wherein the probes operate.

11. The combination defined in claim 1, characterized by a housing enclosing said probing device and cooperating slots, and by means supplying gas under pressure to the interior of the housing enabling the operation of the probing device in such manner as to prevent escape of dust through the slots.

12. The combination defined in claim 11, characterized in that said probing device includes an arm pivotally mounted at one end thereof adjacent the furnace and a plurality of arcuate probles rigidly secured to said arm and movable along arcuate paths concentric with the pivot axis of said arm.

13. In the process of heat-treating fluent mineral solid particles in a vertical shaft furnace of the type wherein a continuously descending column of particles is maintained in said furnace by continuously withdrawing treated particles from the bottom and continuously depositing like quantities of particles to be treated onto the top surface of said column and wherein a current of air initially at ambient temperature is forced counter-currently through the lower part of the column and thence to a spacially separate combustion space and thence into and through the upper part of the column, the improvement which consists in probing the column at a plurality of loci spaced longitudinally of the lower part of the column for chunks of agglomerated particles and crushing such chunks progressively into smaller masses at the several loci, the probing being effected at a rate not substantially greater than the rate of descent of the column through that part of the furnace wherein the probing is being effected.

References Cited in the file of this patent

UNITED STATES PATENTS

| | | |
|---|---|---|
| 446,971 | Heckert et al. | Feb. 24, 1891 |
| 688,651 | Kirk | Dec. 10, 1901 |
| 1,144,168 | Carpenter et al. | June 22, 1915 |
| 1,620,659 | Hodgkinson | Mar. 15, 1927 |
| 2,500,828 | Jackson | Mar. 14, 1950 |
| 2,527,309 | Kelsey | Oct. 24, 1950 |
| 2,531,068 | Maust | Nov. 21, 1950 |

FOREIGN PATENTS

| | | |
|---|---|---|
| 190,547 | Germany | May 26, 1906 |